United States Patent [19]

Matthews et al.

[11] 4,163,910
[45] Aug. 7, 1979

[54] VAPOR GENERATOR AND MHD POWER PLANT

[75] Inventors: Francis T. Matthews, Poquonock; Carl R. Bozzuto, Enfield, both of Conn.

[73] Assignee: Combustion Engineering, Inc., Windsor, Conn.

[21] Appl. No.: 764,119

[22] Filed: Jan. 31, 1977

[51] Int. Cl.$^2$ .............................................. H02N 4/02
[52] U.S. Cl. .................................................. 310/11
[58] Field of Search .......................................... 310/11

[56] References Cited

U.S. PATENT DOCUMENTS

| 3,223,860 | 12/1965 | Brill | 310/11 |
|---|---|---|---|
| 3,303,364 | 2/1967 | Hals | 310/11 |
| 3,337,759 | 8/1967 | Daman | 310/11 |
| 3,355,609 | 11/1967 | Horn et al. | 310/11 |
| 3,449,602 | 6/1969 | Hals | 310/11 |
| 3,467,842 | 9/1969 | Carrasse | 310/11 |
| 3,524,086 | 8/1970 | Lindley | 310/11 |
| 3,720,850 | 3/1973 | Way | 310/11 |

Primary Examiner—Donovan F. Duggan
Attorney, Agent, or Firm—Arthur L. Wade

[57] ABSTRACT

A magnetohydrodynamic generator discharges its gases to a vapor generator. A portion of the heat discharged to the vapor generator is recovered to elevate the temperature of the combustion air to the MHD burner. The burner discharge of an atmospheric heater further raises the temperature of the combustion air. The MHD exhaust gases passed through the vapor generator and the gases discharged from the atmospheric heater are combined to superheat the generated vapor and feed liquid to the vapor generator.

4 Claims, 2 Drawing Figures

VAPOR GENERATOR AND MHD POWER PLANT

BACKGROUND OF THE INVENTION

1. Field of the Invention

The invention relates to combining the structure of a MHD generator and vapor generator to utilize the heat output of the MHD burner to generate vapor, preheat combustion air for the MHD burner and salvage the heat of an independent heat source also applied to raise the temperature of the combustion air to the MHD burner. More specifically, the MHD generator discharge of high velocity products of combustion is directed into a section of the vapor generator which reduces the velocity and separates slag from the gases that the gases may then be used to generate vapor, heat the combustion air of the MHD burner, and combine with the products of combustion of an independent source of heat for the combustion air to superheat the generated vapor and preheat the liquid feed to the vapor generator.

2. Description of the Prior Art

Both thermal and nuclear power stations use high quality steam as a source of power. The vapor (steam) has its power extracted in a turbine. The sophisticated turbine and generator may soon be supplemented by the magnetohydrodynamic (MHD) generator.

In the MHD generator, fuel and air are combusted into working fluid. At a sufficiently high temperature, the working fluid becomes a generating conductor which is passed through a static magnetic field at near-sonic velocity. The induced currents are collected by suitably placed electrodes from which direct current is connected to an external load. A present object is to 'top' a conventional vapor generating plant with the MHD generator and boost the overall efficiency beyond the 50% mark.

Within the broad combination, or marriage, of the vapor generator and MHD generator are several severe problems. First, there is the high velocity of the working fluid from the MHD generator discharging into the vapor generator. This velocity must be reduced and slag must be separated from the gases and flowed to a point of disposal. Second, there is the condensation of the seed material introduced into the MHD generator. Condensation is necessary to avoid its collection on heat exchange surfaces. Third, the need to elevate the temperature of the combustion air to the MHD burner must be met and the overage of heat must be salvaged within the system. These problems are a challenge, but at the same time they underscore the opportunity to produce power at increased efficiency.

STATEMENT OF THE INVENTION

The objects of the invention are inherent in the recognition of the several problems of the art. The high velocity of the exit gases from the MHD generator must be reduced, the slag must be separated and flowed to disposal, the temperature pattern must be established to condense the seed material after the MHD gases have passed through the main vapor generator furnace and upstream of subsequent heat exchange surfaces, the combustion air for the MHD burner must be preheated and any excess heat from the preheating must be utilized to maintain the overall efficiency of the power plant.

The invention contemplates a furnace section receiving the output of the MHD generator with a configuration which will swirl, or cyclone, the output mixture so as to throw, or centrifuge, the slag to the walls of the furnace section and reduce the velocity of the output mixture to conventional furnace velocity values. The output of the section is provided at the top of the section and arranged to pass the gases in a continuing circular pattern into the main section of the furnace for vapor generation.

The invention further contemplates the main vapor generating section sized and shaped to absorb the heat of the MHD gases for vapor generation which will reduce the temperature of the gases to the condensation range of the seed material. This condensed seed material will readily pass through, and over, subsequent, downstream, heat exchange structure without unacceptable collection on its surface.

The invention further contemplates a series of heating stages for the combustion air of the MHD burner. A compressor elevates the pressure and temperature of ambient air and the air is then passed through a low-level heating stage embodied in a bank of tubes in the path of MHD gases flowing from the main furnace of the vapor generator. An independently fired heat exchanger forms a subsequent stage to elevate the temperature of combustion air for introduction to the MHD burner. The discharge of the burner of the independently fired heat exchanger is then mixed with the MHD gases from the vapor generator and passed over a superheater and feed liquid pre-heater in order to conserve heat.

Other objects, advantages and features of the invention will become apparent to one skilled in the art upon consideration of the written specifications, appended claims, and accompanying drawings.

DRAWING DESCRIPTION

FIG. 1 is a flow diagram of the fluids flowing between and through the units of a vapor generating system in which the invention is embodied; and FIG. 2 is a somewhat diagrammatic plan view of a combination vapor generator and MHD generator for the system of FIG. 1.

DESCRIPTION OF THE PREFERRED EMBODIMENT

OVERVIEW

The magnetohydrodynamic (MHD) generator is the title-description of a system in which a stream of hot, electrically conducting gas or liquid is passed through a magnetic field to generate an electric current directly without the use of rotating machinery. The concept is grounded in the pioneering work of Faraday.

The variations of the basic MHD scheme are presently considered in two broad classes, the open and the closed cycle. The development of the open cycle MHD system is centering around a steam, or combination steam-gas turbine, bottoming cycle for power generation. More specifically, a plasma is formed in the combustion chamber of the MHD burner by the ionization of combustion products at high flame temperature. Ionization levels are enhanced by the introduction of seed materials, such as potassium or cesium. These gases are then accelerated through a nozzle to high velocity and pass through the channel of the MHD generator where direct current is produced. A diffuser section beyond the MHD channel is used to recover the gas kinetic energy.

The gases discharged from the MHD generator can then be passed to a conventional steam cycle. The literature of the art refers to these steam systems as bottoming cycles. Whatever bottoming cycle, the gases are then exhausted to a stack cleanup system, the seed material recovered, and the seed material recycled back to the MHD generator.

In this overview, the MHD generator can be simply blocked into the disclosure as a source of heat. As a source of heat, the output gases of the MHD generator are passed through a vapor generator. The vapor produced can then power a turbine-electric generator set for the production of electrical power in addition to that produced by the MHD generator.

Figure 1:
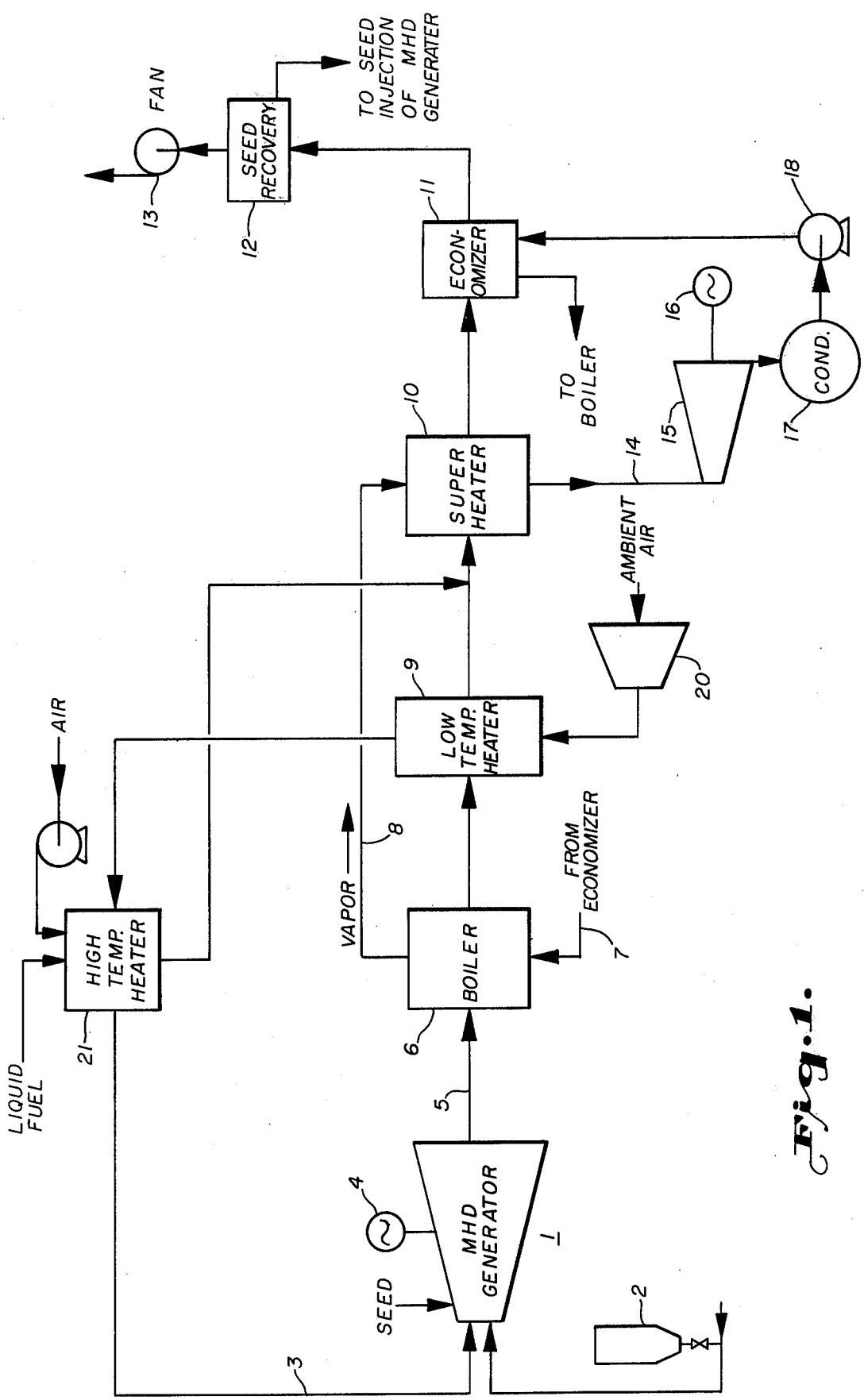

FIG. 1 discloses the overview of the system in diagrammatic form. The MHD generator 1 has its burner supplied coal, as fuel, from 2 and compressed, high-temperature air from conduit 3. The electric power output is indicated at 4. The output gases discharged are conducted from the MHD generator at 5.

Vapor generator 6 receives the hot gases of conduit 5 and liquid feed from conduit 7. The heat of the gases vaporizes the liquid which flows from generator 6 by way of conduit 8.

Downstream from the generator 6, heat exchangers 9, 10 and 11 extract more heat from the MHD gases. Combustion air for the MHD generator is heated in exchanger 9. The vapor generated in 6 is superheated in exchanger 10. The feed liquid for 6 is preheated in exchanger 11.

The MHD gases are now flowed downstream to a combined fly ash removal and seed recovery system 12. The MHD gases are exhausted up an exhaust gas stack after passing through a fan 13.

The superheated vapor flowing from exchanger 10 in conduit 14 is the motive fluid for turbine 15. Turbine 15 drives an electric generator 16 to produce electrical power in addition to that electrical power produced at 4 by MHD generator 1. The motive fluid from turbine 15 is flowed to condenser 17 and picked up by a pump 18 to be preheated by at least exchanger 11 before being returned to vapor generator 6 through conduit 7.

The air required for combustion in the MHD generator 1 is picked from ambient by compressor 20, heated in exchanger 9 and further heated to the temperature required by the MHD burner in separately fired heater 21.

COMBUSTION AIR SYSTEM

Adequate levels of seeded plasma conductivity in the MHD channel are obtained only when gas temperatures are in excess of 4,000° F. To achieve these high temperatures, fossil fuels must be burned in the MHD generator with high temperature air or oxygen-enriched air. The preferred embodiment contemplates the temperature elevation of the combustion air. Depending upon the fuel used, the air is to be preheated to a range in the order of 2,500° F. to 3,000° F.

It is a hope for the future that commercial systems will have an in-line, fully regenerative, high temperature air heater. The present embodiment contemplates an axial flow compressor 20 which will raise ambient air to some intermediate temperature. The compressor 20 will deliver its output to the exchanger 9 which is designated as a low temperature air heater. This heater 9 will raise the temperature of the compressed air to a higher level. The final stage of heating is carried out in separately fired heater 21 to reach the 2,500° F. to 3,000° F. range required by the MHD burner.

The separately fired heater 21 is expected to have a burner supplied clean fuel and air. After the products of this combustion have heated the air for the MHD burner they are conducted to the backpass of the vapor generator and mixed with the MHD gases. This mixture is then passed over the surfaces of the vapor superheater 10 and feed liquid preheater 11.

The embodiment contemplates the combustion air delivered to the burner of the MHD generator 1 by conduit 3 will be burned with coal. The pressurized coal feed system 2 is planned to comprise plural mills feeding pressurized storage hoppers. The hoppers feed pressurized primary injector tanks through multi-valved storage injectors. Filling and pressurization is done using compressed flue gas during operation and from an inert gas generator during startup. Pulverized coal is aspirated from the primary injector to the fuel nozzles using primary air.

This portion of the disclosure has gone far enough with the air, and fuel, systems of the MHD generator. The concepts of the invention are in the arrangement to handle the gases discharged from the MHD generator into the vapor generator, structural arrangements to insure condensation of the seed material upstream of the exchangers mounted in the backpass of the vapor generator, the stage heating of the combustion air for the MHD burner and the mixing of the products of combustion from the independently fired air heater with the MHD gases in the backpass upstream of the superheater and feed liquid exchanger.

MHD GENERATOR/VAPOR GENERATOR

Figure 2:
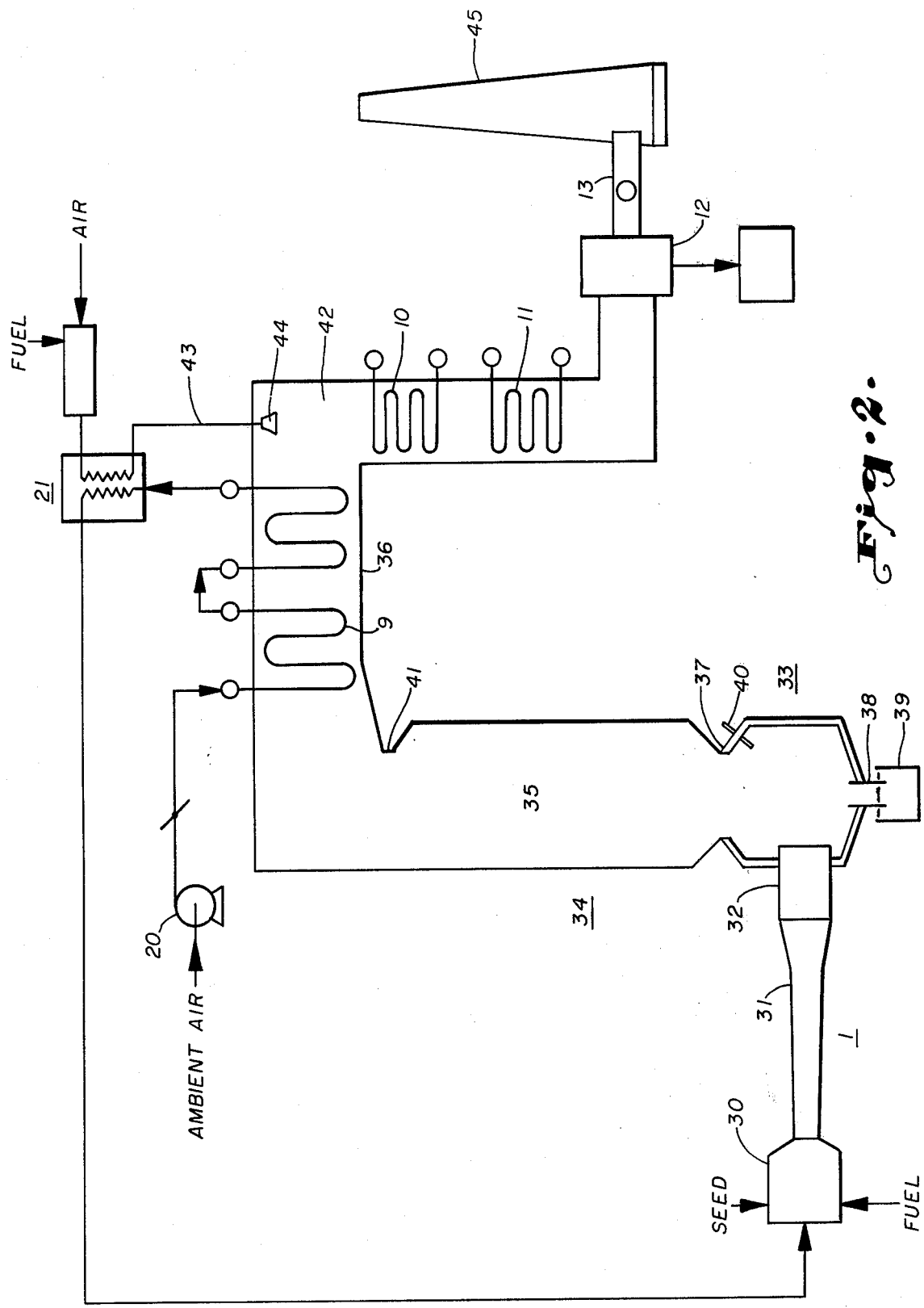

FIG. 2 discloses the preferred embodiment of the invention with a somewhat diagrammatic elevation view of the MHD generator as connected to its supplies of fuel, air and seed material and discharging into the lower section of the vapor generator. The relation between the FIG. 1 and FIG. 2 disclosure will be maintained by use of common reference numerals where appropriate. The beginning is with MHD generator 1 and its burner 30, diffuser 31 and discharge duct 32.

Discharge duct 32 is connected to bottom section 33 of steam generator 34. The gases passed through the main furnace section 35 flow through the backpass 36, in which exchangers 9, 10 and 11 are mounted. A particulate and seed recovery system 12 receives the gases finally discharged from the backpass. Induced draft fan 13 pulls all of the gases through the system and discharges them to atmosphere through a stack.

This description of FIG. 2 is a second overview of the embodiment of the invention. The staged heating of the combustion air for the MHD burner is more clear in the flow pattern from compressor 20, low temperature heat exchanger 9, and high temperature heater 21. Also, it is more evident how the burner discharge from heater 21 is directed into the backpass 36 to mix with the MHD gases. Finally, the greatest gain in clarity is how the MHD generator and steam generator are joined at the MHD discharge duct 32 and bottom section 33 of steam generator 34.

DUCT 32/SECTION 33

The MHD gases from their generator leave duct 32 at a high velocity and temperature. The duct 32 directs the MHD gases tangentially into bottom section 33 where they develop a swirling motion. The high forward velocity of the MHD gases is reduced by both expansion from duct 32 into bottom section 33 and by the swirl induced by tangential injection into the multi-sided section.

The MHD gases, spiraled in section 33, are turned upward to pass through neck 37 to the evaporative section 35 of steam generator 34. The neck 37 is shaped and sized at the top of section 33 so it will maintain the MHD gases in a swirl as they flow through the neck. Also, the neck 37 functions to collect any entrained slag particles from the gases.

Within section 33, slag in the gases is separated by centrifugal force and collects on the refractory-lined walls of the section. The collected slag will run down to the bottom, toward the lowest point of the bottom. A slag tap 38 is provided at the lowest point of section 33 with an overflow level sufficient to keep a shallow pool of liquid slag on the bottom of the section and transfer excess slag through the bottom into a slag quench tank 39. Sufficient water level is maintained in the quench tank to provide a liquid seal for the slag tap to prevent gases from the bottom section from entering the quench tank.

A warm-up burner 40 is disclosed as mounted through the upper wall of section 33. There is, of course, a supply of fuel and air for this burner 40, although the disclosure is not encumbered with that system.

Section 33 is built to receive the extremely high temperature of the MHD burner discharge. On start-up the temperature differential between the section 33 and burner discharge can be large. The present design for section 33 calls for a ceramic lining for section 33. Ceramic material can be quite brittle when exposed to thermal shock. The concept of mounting burner 40 through the wall of section 33 results in warming the inside walls of chamber 33 to obviate the thermal shock to the internal walls of section 33 at start-up of the system.

FURNACE EVAPORATOR SECTION 35

The swirling MHD gases discharge from the neck 37 upward into section 35 of the steam generator 34. The swirling motion maintained for the gases enchances heat exchange between the gases and liquid in the tubes lining the walls of section 35. The heat of the gases evaporate the liquid to form vapor in the conventional manner. The vapor is flowed to superheater 10 and then to turbine 15, generator 16 by way of conduit 14 (FIG. 1).

Furnace section 35 is sized and arranged to transfer heat from the MHD gases to evaporate vapor in reducing the gas temperature below the condensation temperature of whatever seed material was injected into the MHD burner 30 to increase gas ionization. Seed compounds in the form of potassium carbonate, potassium sulfate or potassium oxide will have a condensation temperature of between 2,000 F. and 2,200 F. Therefore, the design of section 35 will reduce the gas temperature at the upper neck 41 to below 2,000 F.

The condensed seed material will form very small particles. These particles will be carried through the downstream exchangers with the gas. With proper spacing between the tubes of the exchangers, and a proper velocity for the gas, no significant build up of seed will occur on the tubes.

TEMPERATURE PATTERN SUMMATION

The gas discharging from the MHD generator 1 will have a temperature at, or near, 3,600 F. The size and arrangement of bottom section 33 keeps the gases and slag above the fusion temperature 2,400 F. to 2,800 F. so a well running slag can be expected.

The vaporization temperature of all ash constituents such as aluminum silicates is about 3,700 F. Therefore, with a maximum bottom section gas temperature below 3,700 F., there is no danger of passing ash in vapor form out of the top of the bottom section.

Again, the design of furnace section 35 reduces the temperature of the MHD gases flowing to top of section 35 to below 2,000 F. Therefore, the seed material will be condensed before the entraining gases reach the so-called backpass 36 of the furnace in which exchangers 9, 10 and 11 are mounted.

BACKPASS 36

The MHD gases flow to the top of furnace section 35 and then flow into the horizontal section of backpass 36 and over one or more banks of low temperature air heater tubes 9. Multiple banks of tubes are provided so that the tube diameter, tube spacing, number of tubes and surface heat transfer enhancers such as fins and pins in each bank may be adjusted for maximum heat transfer and/or minimum surface area and low temperature air side pressure drop. A back cavity 42 is provided in backpass 36, downstream of exchanger 9, to receive the MHD gases.

Combustion product gases produced in the burner of the high temperature heater 21 pass through the heater to raise the temperature of the combustion air for the MHD burner to its final temperature and are then conducted by 43 to back cavity 42. An injection-mixing system 44 is specifically mounted in back cavity 42 and connected to conduit 43. This system mixes the heater gases with the MHD gases downstream of the low temperature heater 9.

The combined gas flows, at an intermediate temperature between that temperature of the gas leaving the low temperature air heat exchanger 9 and the high temperature air heater 21. The flow of these combined gas flows is disclosed as downward over superheater 10 and the feedwater heater, or economizer, 11.

FINAL GAS DISCHARGE

All usable, recoverable, salvagable heat should be extracted from the gases after they pass through backpass 36. A recovery system 12 has been indicated for recovery of the seed material. There remains only a discharge of clean, pollution-free gases through the exhaust stack 45. The seed material is recycled to the MHD generator.

CONCLUSION

The MHD generator consumes fuel and air and produces electrical power and products of combustion with a very high temperature. The steam generator consumes fuel and air and produces vapor which a turbine-generator set converts to electrical power. Substituting the heat output of the MHD generator for the fuel and air supplies to the vapor generator is logical. The vapor generator salvages the heat output of the MHD generator by converting it to electrical power. In this combination, 50% efficiency is approached.

In directing the MHD generator heat output into the vapor generating furnace there are some severe problems. A special section of the furnace is required to receive the high velocity-high temperature MHD gases. This section is sized and arranged to reduce the velocity of the gases, separate slag from the gases and deliver the gases to the main evaporator section so they will give up their heat to the liquid and turn the liquid into vapor.

Further, the remaining heat in the MHD gases is recovered by transferring part of it to the combustion air for the MHD generator. And, the air is heated further to the high level required for MHD generator consumption.

The high-temperature heater of the last stage of combustion air heating has its residual heat of its products of combustion routed to the backpass of the vapor generator for use in superheating the vapor and preheating the feed liquid to the evaporator system.

The present invention brings the MHD generator and vapor generator together. But it brings them together by accommodation of the MHD generator in a special chamber of the vapor generator, condensing seed material ahead of the backpass of the vapor generator, stage heating the combustion air and salvaging the high temperature output of the final stage of combustion air heating.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for generating power from the combustion of fuel and air, including a magnetohydrodynamic burner, a source of combustible fuel connected to the burner, a furnace bottom section connected to the discharge duct of the burner so as to receive the hot MHD discharge gases directed tangentially into the section, whereby slag in the gases is separated from the gases by centrifugal force and collects on the refractory-lined wall to run to the low point of the section and the high forward velocity of the MHD discharge gases is reduced by both expansion and the swirl induced by tangential injection, a slag quench tank connected to the section at the low point for transfer of excess slag from the section, a neck discharge at the top of the section and sized and shaped to maintain the swirl in the discharge gases and capture entrained slag particles, a main furnace section connected to the discharge neck to receive the MHD discharge gases and transfer heat from the gases to liquid in generating vapor as a source of power, a backpass section connected to the gas discharge of the main furnace section and receiving the MHD discharge gases, heat exchange tubes mounted in the backpass section and connected to a source of combustion air for the MHD burner for the transfer of heat from the discharge gases to the combustion air, an air compressor connected to the entrance of the heat exchange tubes mounted in the backpass section as the source of combustion air for the MHD burner, and a high temperature air heater separately fired by an atmospheric burner connected to the exit of the heat exchange tubes for raising the temperature of the combustion air to the final temperature required by the MHD burner, and an injection-mixing system mounted in the backpass section and connected to the discharge of the atmospheric burner of the high temperature air heater to mix the burner discharge with the MHD burner gases after the burner discharge has heated the combustion air for the MHD burner.

2. The system of claim 1 in which, the injection-mixing system is mounted in the backpass section downstream of the heat exchange tubes with which the combustion air for the MHD burner is heated.

3. The system of claim 2 including, heat exchange tubes mounted in the backpass section downstream of the injection-mixing system and connected to the vapor generated in the main furnace section to further heat the generated vapor by the combined flow of the MHD burner gases and the discharge of the atmospheric burner of the high temperature air heater.

4. The system of claim 3 including, heat exchange tubes mounted in the backpass section downstream of the injection-mixing system and connected between a source of feed liquid and the heat exchange tubes of the main furnace section in which the vapor is generated as a source of power.

* * * * *